United States Patent
Jadidi et al.

(10) Patent No.: US 10,642,821 B2
(45) Date of Patent: May 5, 2020

(54) ELASTIC DATA STORAGE SYSTEM

(71) Applicant: Apple Inc., Cupertino, CA (US)

(72) Inventors: Amir H. Jadidi, San Jose, CA (US); Rudolf Psenicnik, San Jose, CA (US)

(73) Assignee: Apple Inc., Cupertino, CA (US)

( * ) Notice: Subject to any disclaimer, the term of this patent is extended or adjusted under 35 U.S.C. 154(b) by 360 days.

(21) Appl. No.: 15/462,609

(22) Filed: Mar. 17, 2017

(65) Prior Publication Data

US 2018/0268013 A1 Sep. 20, 2018

(51) Int. Cl.
*G06F 16/23* (2019.01)
*G06F 16/22* (2019.01)
*G06F 16/2453* (2019.01)
*G06F 12/0875* (2016.01)
*G06F 12/0891* (2016.01)
*G06F 12/0868* (2016.01)

(52) U.S. Cl.
CPC ...... *G06F 16/2358* (2019.01); *G06F 12/0868* (2013.01); *G06F 12/0875* (2013.01); *G06F 12/0891* (2013.01); *G06F 16/22* (2019.01); *G06F 16/2282* (2019.01); *G06F 16/2453* (2019.01); *G06F 2212/465* (2013.01); *G06F 2212/601* (2013.01)

(58) Field of Classification Search
CPC ...................................................... G06F 17/30
USPC ........................................................ 715/733
See application file for complete search history.

(56) References Cited

U.S. PATENT DOCUMENTS

| | | | | |
|---|---|---|---|---|
| 8,775,397 | B2 * | 7/2014 | Dong | G06F 16/23 707/705 |
| 9,613,096 | B2 * | 4/2017 | Marais | G06F 16/2365 |
| 9,740,741 | B2 * | 8/2017 | Plattner | G06F 16/24539 |
| 10,157,134 | B2 * | 12/2018 | Guthrie | G06F 12/0811 |
| 10,169,090 | B2 * | 1/2019 | Wang | G06F 16/285 |
| 10,223,009 | B2 * | 3/2019 | Simionescu | G06F 12/0864 |
| 10,235,440 | B2 * | 3/2019 | Lee | G06F 16/2315 |
| 10,242,075 | B2 * | 3/2019 | Lim | G06F 16/252 |
| 2014/0379991 | A1 * | 12/2014 | Lomet | G06F 12/0891 711/135 |

* cited by examiner

*Primary Examiner* — Kim T Nguyen
(74) *Attorney, Agent, or Firm* — Dickinson Wright RLLP

(57) ABSTRACT

Disclosed herein are techniques for implementing a database system that provides flexible organizational aspects while retaining the ability to process and respond to database queries in an efficient manner. In particular, the techniques involve utilizing characteristics of both entity-attribute-value (EAV) database technologies and relational database technologies to provide a hybrid approach that exploits a large number of their benefits while eliminating a large number of their deficiencies. According to some embodiments, the techniques can involve implementing at least one central storage repository (configured to implement an EAV-style database), where the central storage repository provides information to at least one distributor to enable the establishment of at least one cached table (implemented in accordance with relational-style databases) within at least one cached storage device. In turn, the cached storage device can process fetch-based queries issued by client computing devices in a highly efficient manner.

20 Claims, 12 Drawing Sheets

Step 2: At the database manager, execute a request to add the entity "Car" with the properties "Make", "Model", "VIN", "Color".

Step 4: At the database manager, execute a request to insert a first Car into the database: Make:Toyota, Model:Prius, VIN:12345, and Color:Blue.

*206*

| ENTITY VALUES ||||||
|---|---|---|---|---|
| ID | INSTANCE_ID | PROPERTY_ID | VALUE | RELATED_INSTANCE_ID |
| 143 | 1994 | 74 | Toyota | Null |
| 144 | 1994 | 75 | Prius | Null |
| 145 | 1994 | 76 | 12345 | Null |
| 146 | 1994 | 77 | Blue | Null |

Step 5: At the database manager, issue (1) database delta information (based on the fourth request), and (2) cached table storage configuration information, to a distributor.

Step 6: At the distributor, generate at least one cached table update based on (1) the database delta information, and (2) the cached table storage configuration information, to cause the following tables to be established within at least one cached table storage:

Generate Car, Dealership, and Dealership:Cars Cached Tables.

*232*

| CAR CACHE |||||
|---|---|---|---|---|
| ID | MAKE | MODEL | VIN | COLOR |
| 1994 | Toyota | Prius | 12345 | Blue |

*234*

| DEALERSHIP CACHE ||||
|---|---|---|---|
| ID | NAME | ADDRESS | TELEPHONE |

*236*

| DEALERSHIPS:CARS CACHE |||||
|---|---|---|---|---|
| ID | MAKE | MODEL | VALUE | COLOR |

*FIG. 2D*

Step 7: At the database manager, execute a request to insert a dealership into the database: Name:Autonation, Address:Sunnyvale, Telephone:0001112222, and Cars:{1994}.

*208*

| ENTITY VALUES | | | | |
|---|---|---|---|---|
| ID | INSTANCE_ID | PROPERTY_ID | VALUE | RELATED_INSTANCE_ID |
| 143 | 1994 | 74 | Toyota | Null |
| 144 | 1994 | 75 | Prius | Null |
| 145 | 1994 | 76 | 12345 | Null |
| 146 | 1994 | 77 | Blue | Null |
| 151 | 1995 | 75 | Autonation | Null |
| 152 | 1995 | 76 | Sunnyvale | Null |
| 153 | 1995 | 77 | 0001112222 | Null |
| 154 | 1995 | 78 | 1994 | 1994 |

Step 8: At the database manager, issue (1) database delta information (based on the fourth request), and (2) cached table storage configuration information, to a distributor.

Step 9: At the distributor, generate at least one cached table update based on (1) the database delta information, and (2) the cached table storage configuration information, to cause the cached tables to be updated in the following manner:

*232*

| CAR CACHE | | | | |
|---|---|---|---|---|
| ID | MAKE | MODEL | VIN | COLOR |
| 1994 | Toyota | Prius | 12345 | Blue |

*234*

| DEALERSHIP CACHE | | | |
|---|---|---|---|
| ID | NAME | ADDRESS | TELEPHONE |
| 1995 | Autonation | Sunnyvale | 0001112222 |

*236*

| DEALERSHIPS:CARS CACHE | | | |
|---|---|---|---|
| ID | DEALERSHIP_ID | CAR_ID | PROPERTY_ID |
| 1 | 1995 | 1994 | Property_id |

*FIG. 2E*

ELASTIC DATA STORAGE SYSTEM

FIELD OF INVENTION

The embodiments described herein set forth techniques for implementing a database system that provides flexible organizational aspects while retaining the ability to process and respond to database queries in an efficient manner. In particular, the techniques involve utilizing characteristics of both entity-attribute-value (EAV) database technologies and relational database technologies to provide a hybrid approach that exploits a large number of their benefits while eliminating a large number of their deficiencies.

BACKGROUND

Virtually all software applications rely on some form of a database schema as a foundational element to their design and operation. Presently, while many different forms of useful/powerful databases are available, software developers are often faced with accepting at least some undesirable qualities when deciding on a database technology with which their software will interact. For example, an entity-attribute-value (EAV) database can provide the substantial benefit of high flexibility in that the overall organization of the EAV-style database can easily be modified to accommodate a corresponding software product that evolves over time. However, EAV-style databases are deficient in that they are relatively slow (e.g., when processing and responding to database queries), at least in comparison to other popular database technologies (e.g., relational databases that implement some form of Sequential Query Language (SQL)). Conversely, while SQL-based databases are highly efficient in their ability to process and respond to database queries, these databases suffer from inflexibility in that they cannot easily be modified to accommodate corresponding software products as they evolve over time. Consequently, it is desirable for a database technology to exist that provides flexible organizational aspects while retaining the ability to process and respond to database queries in an efficient manner.

SUMMARY OF INVENTION

Accordingly, representative embodiments set forth herein disclose techniques for implementing a database system that provides flexible organizational aspects while retaining the ability to process and respond to database queries in an efficient manner. In particular, the techniques involve utilizing characteristics of both entity-attribute-value (EAV) database technologies and relational database technologies to provide a hybrid approach that exploits a large number of their benefits while eliminating a large number of their deficiencies.

According to some embodiments, a central storage repository can implement an EAV-style database, where the central storage repository includes at least one entity table, at least one attribute table, and at least one value table. Notably, as these tables evolve in organization and are populated with data over time—which can be carried out in a highly-flexible manner (as a benefit of the EAV-style database)—the central storage repository can identify conditions in which it is prudent to establish different cached tables that are distributed to cached storages. In particular, the central storage repository can be configured to interface with at least one distributor, where the at least one distributor receives update notifications/configuration changes from the central storage repository (when the aforementioned conditions are met), and then interfaces with the cached storages to update the cached tables where appropriate. In turn, the cached storages can utilize the cached tables to efficiently receive, process, and respond to fetch-based requests issued by client devices. In this manner, the embodiments set forth herein establish a database system that exploits the benefits of both EAV-style and relational-style databases, while also eliminating many of their undesirable qualities.

Accordingly, one embodiment sets forth a method for updating distributed cached tables associated with a database. According to some embodiments, the method can be implemented by a central storage repository computing device that is configured to communicate with at least one distributor computing device, and can include the steps of (1) receiving and executing at least one database change query, (2) analyzing the at least one database change query against cached table storage configuration information to determine whether an update to at least one cached table is required, and (3) in response to determining that the update to the at least one cached table is required: providing, to at least one distributor associated with the cached table storage configuration information, database delta information that reflects the execution of the at least one database change query.

Another embodiment sets forth another method for updating distributed cached tables associated with a database. According to some embodiments, the method can be implemented by a central storage repository computing device that is configured to communicate with at least one distributor computing device, and can include the steps of (1) receiving a fetch query for data stored in the database, (2) analyzing aspects of the fetch query to identify costs and benefits associated with establishing at least one cached table for the query, and (3) in response to determining that the benefits exceed the costs: updating cached table storage configuration information associated with the database to reflect the fetch query, and providing, to at least one distributor, (i) the cached table storage configuration information, and (ii) data associated with the fetch query, to cause the at least one distributor to establish the at least one cached table within at least one cached table storage.

Yet another embodiment sets forth an additional method for updating distributed cached tables associated with a database. According to some embodiments, the method can be implemented by a distributor computing device configured to interact with both a central storage repository and at least one cached table storage, and can include the steps of (1) receiving, from a database manager, (i) database delta information that reflects an execution of at least one database change query, and (ii) cached table storage configuration information, and (2) identifying, based on (i) the database delta information, and (ii) the cached table storage configuration information, appropriate changes to be propagated to a least one cached table storage, where the at least one cached table storage includes at least one cached table associated with the database delta information. The method can further include the steps of (3) generating at least one cached table update that, when issued to the at least one cached table storage, causes the appropriate changes to be propagated to the at least one cached table, and (4) issuing the at least one cached table update to the at least one cached table storage.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 2A-2E illustrate conceptual diagrams of an example scenario in which a central storage repository is configured to identify conditions under which the creation of/updates to cached tables should be executed, according to some embodiments.

DETAILED DESCRIPTION

Figure 1A:
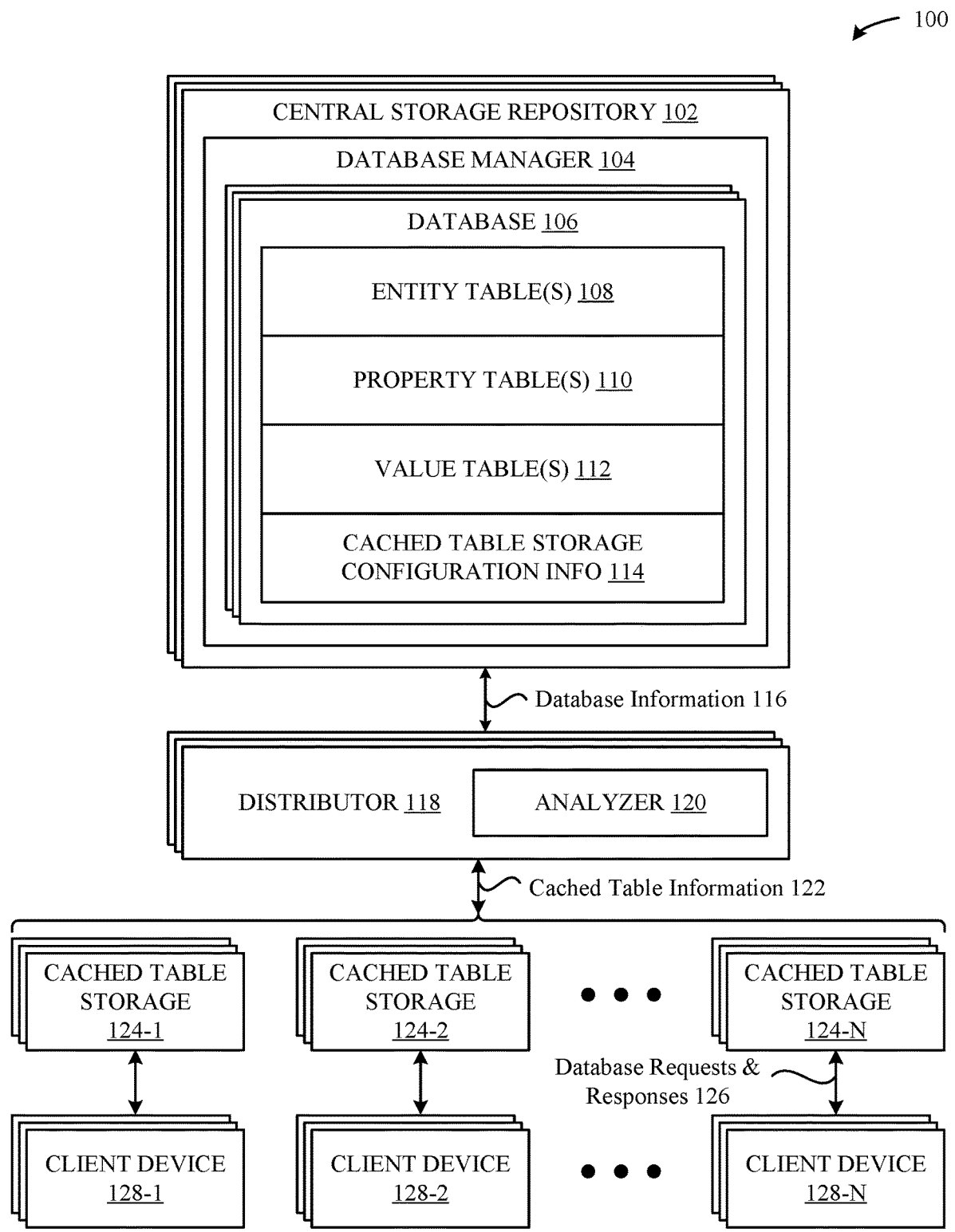
FIGS. 1A-1B illustrate overviews of a system that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

The embodiments described herein set forth techniques for implementing a database system that provides flexible organizational aspects while retaining the ability to process and respond to database queries in an efficient manner. In particular, the techniques involve utilizing characteristics of either or both entity-attribute-value (EAV) database technologies and relational database technologies to provide a hybrid approach that exploits a large number of their benefits while eliminating a large number of their deficiencies.

According to some embodiments, a central storage repository can implement an EAV-style database, where the central storage repository includes at least one entity table, at least one attribute table, and at least one value table. Notably, as these tables evolve in organization and are populated with data over time—which can be carried out in a highly-flexible manner (as a benefit of the EAV-style database)—the central storage repository can be configured to identify conditions in which it is prudent to establish different cached tables across one or more cached storages. Such conditions can involve, for example, receiving database update queries that are directed toward modifying the EAV-style database in some manner, e.g., adding/modifying/deleting table structures, adding/modifying/deleting entries within the table, and so on. The conditions can also involve receiving database fetch queries that meet certain criteria, e.g., a frequency of receipt of the same or similar fetch queries, a number of conditions set forth in the fetch queries that require processing, and so on.

According to some embodiments, the central storage repository can be configured to interface with at least one distributor, where the at least one distributor receives update notifications/configuration changes from the central storage repository (when the aforementioned conditions are met), and then interfaces with the cached storages to update the cached tables where appropriate. In turn, the cached storages can utilize the cached tables to efficiently receive, process, and respond to fetch-based requests issued by client devices.

Accordingly, the embodiments set forth herein establish a database system that possesses the benefits of either or both EAV-style and relational-style databases, while also eliminating many of their undesirable qualities. A more detailed description of the database system, and the manner in which it can be implemented, is provided below in conjunction with FIGS. 1, 2A-2E, 3A-3B, 4A-4B, and 5.

Figure 1B:
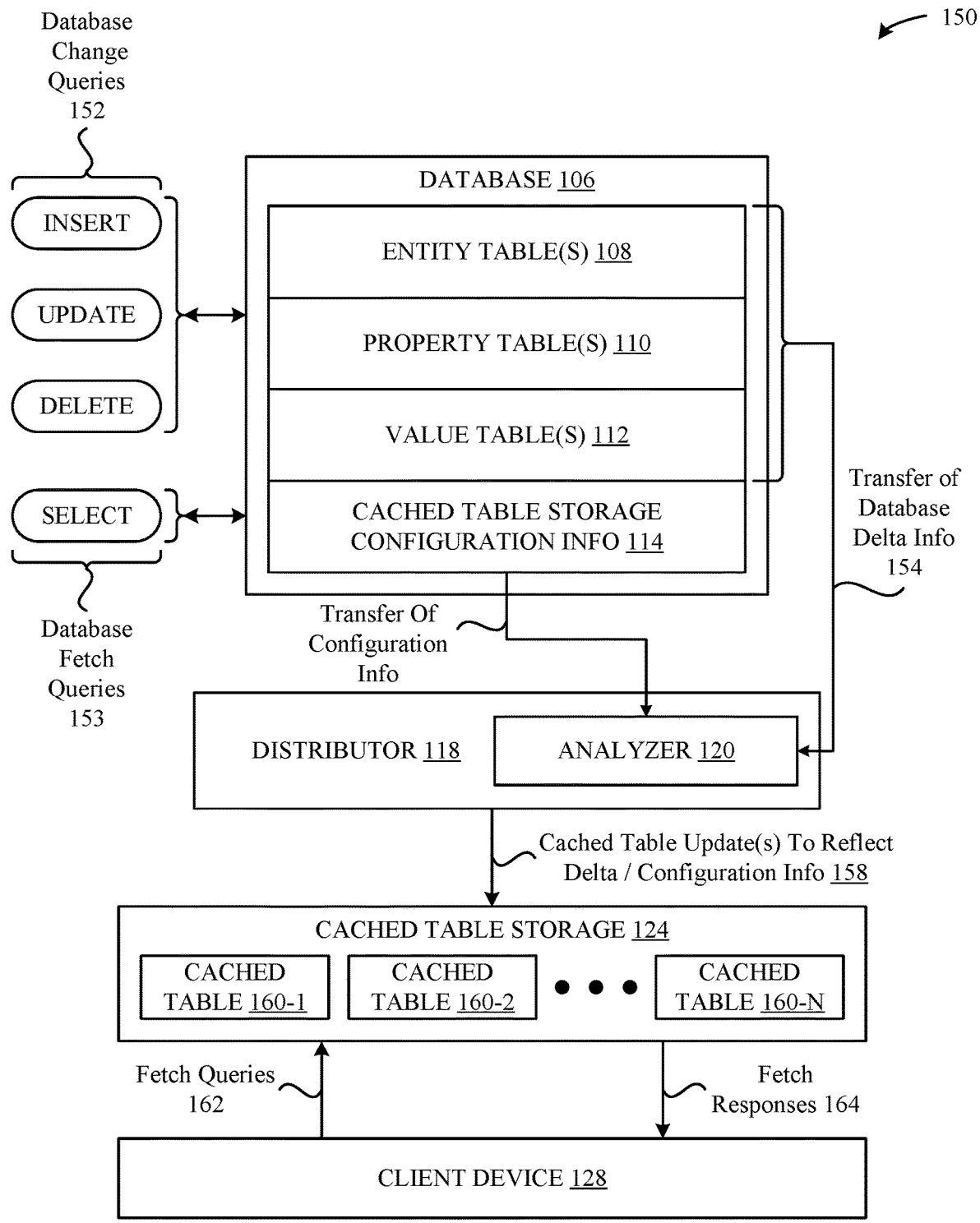

FIGS. 1A-1B illustrate overviews of a system 100 that includes different computing devices that can be configured to implement the various techniques described herein. It is noted that the following description of the different devices illustrated in FIGS. 1A-1B is meant to be introductory, and that a more detailed breakdown of their functionality is provided below in conjunction with FIGS. 2A-2E, 3A-3B, and 4. As shown in FIG. 1A, the system 100 can include at least one central storage repository 102 that can be configured to implement at least one database manager 104. According to some embodiments, the database manager 104 can manage at least one database 106 that is primarily modeled in accordance with the entity-attribute-value (EAV) paradigm. For example, as shown in FIG. 1A, the database 106 can include at least one entity table 108, at least one property table 110, and at least one value table 112. Notably, and as is well-understood, these tables can collectively provide the basic framework required to implement an EAV-style database. However, these EAV-based tables can be supplemented with additional tables that depart from the EAV paradigm—specifically, tables modeled in accordance with relational databases—to produce the hybrid approach that is set forth herein.

As shown in FIG. 1A, the database 106 can also include cached table storage configuration information 114, which, as described in greater detail herein, can be utilized to control the manner in which data flows between the central storage repository 102 and other computing devices included in the system 100. For example, as shown in FIG. 1A, the system 100 can include at least one distributor 118 that is configured to communicate with the central storage repository 102. In particular, an analyzer 120—which is a software entity implemented by the distributor 118—can be configured to transmit/receive database information 116—e.g., the cached table storage configuration information 114, database delta information, information about queries received from cached table storages, etc.—with the central storage repository 102. As described in greater detail herein, the communication of cached table storage configuration information 114 between the database manager 104 and the analyzer 120 can take place in accordance with a variety of approaches, e.g., periodically, in response to updates made to the database 106, and so on.

Additionally, and as shown in FIG. 1A, the analyzer 120 can be configured to communicate cached table information 122 (e.g., database update commands, database data, etc.) with at least one cached table storage 124. According to some embodiments, the analyzer 120 can be configured to distribute the cached table information 122 to the cached table storage 124 in accordance with the cached table storage configuration information 114. In turn, the cached table storage 124 can utilize the cached table information 122 to manage database requests & responses 126 issued in association with various client devices 128. According to some embodiments, the cached table information 122 can be include (or be used to establish) "flattened" tables that are derived from the database 106 based on, for example, the overall structure of the database 106, the queries expected to be issued by the client devices 128, and so on. In particular, and as described in greater detail herein, a flattened table—also referred to herein as a "cached table"—can take the form of a relational-style table, where the columns of the table are selected in accordance with the overall organization/operation of the database 106. For example, a cached table can be established based on queries that are frequently issued by client devices 128, queries that are computationally-intensive (e.g., complex conditions associated with a "WHERE" clause, costly "JOIN" operations, etc.), and so on. In this manner, the cached table storages 124 can utilize the cached tables to readily and efficiently respond to the requests (e.g., fetch-based requests) issued by the client devices 128.

FIG. 1B illustrates an additional overview of the system 100 and provides a more detailed breakdown of the interactions that can occur between the various computing devices of the system 100. As previously noted herein, the communication of the database information 116 between the database manager 104 and the analyzer 120 can be triggered by a variety of conditions being met, e.g., when update-based queries are issued against one or more of the entity tables 108, the property tables 110, and the value tables 112. This notion is illustrated in FIG. 1B by the database change queries 152, which can involve, for example, insertions of, updates to, and deletions of database structures and/or data within the database 106. For example, when a new property of a particular entity is added to the property table 110, an appropriate follow-up operation can involve the database 106 identifying (1) the net changes that occur as a result of the addition of the property (also referred to herein as the "delta"), and (2) determining, based on the cached table storage configuration information 114, whether the net changes require an update (e.g., a creation, a modification, a deletion, etc.) to any cached tables managed by cached table storages 124. For example, when the net changes made to the database 106 are associated with at least one cached table 160, it may be appropriate for the database 106 to transmit database information 116 to enable the necessary changes to be propagated to the at least one cached table 160. As shown in FIG. 1B, the database information 116 can include (1) the net changes to the database 106 (illustrated in FIG. 1B as the transfer of database delta information 154), and (2) the cached table storage configuration information 114 itself (or a subset of the cached table storage configuration information 114) (illustrated in FIG. 1B as the transfer of configuration information).

Additionally, the communication of the database information 116 between the database manager 104 and the analyzer 120 can be triggered when database fetch queries 153 (e.g., selecting data from the database 106) meet particular conditions (that are analyzed by the database manager 104). The conditions can include, for example, a frequency at which the same (or similar) fetch queries are received by the database 106, a number of conditions included in fetch queries, an average size of the data retrieved in association with the fetch query, and so on. It is noted that the foregoing conditions are merely exemplary and that the database manager 104 can be configured to analyze any and all aspects of the fetch queries to effectively determine when updates should be made to the cached tables 160. For example, to effectively determine whether such fetch queries should result in the creation of/update to one or more cached tables 160, the database manager 104 can be configured to implement a cost vs. benefit analysis against the fetch queries as they are received. For example, a cost can be based in part on an amount of storage space that will be required to store at least one copy of the data associated with the fetch query within at least one cached table 160, an amount of bandwidth that will be required to transmit the at least one copy of the data to the at least one cached table 160 (via the associated distributor 118/corresponding at least one cached table storages 124), and so on. In another example, a cost can be based on a number of conditions that are included in the fetch query, e.g., a number of properties/values listed in a "WHERE" clause of a "SELECT" database query, a number of tables listed in the "FROM" clause of the "SELECT" database query, and so on. Similarly, the benefits—which are compared against the costs—can be based on a variety of factors, e.g., a reduction in processing that will be achieved by carrying out similar and subsequent fetch queries using the cached table, savings in overall bandwidth that can be achieved by localizing the storage of the cached tables 160, and so on.

It is noted that the database manager 104 can be configured to implement machine learning techniques against both the database change queries 152 and the database fetch queries 153 (as they are received) to effectively identify ways to enhance the overall performance characteristics of the system 100. According to some embodiments, the machine learning techniques implemented by the database manager 104 can take a variety of factors associated with the operation of the system 100 when determining how the cached table storage configuration information 114 should be established/adjusted. For example, the machine learning techniques can consider the physical locations of the distributors 118, cached table storages 124, and client devices 128, and modify the cached table storage configuration information 114 to cause the cached tables 160 to be distributed in an appropriate manner (e.g., to reflect localization characteristics). The factors can also include overall storage space availability, which is directly impacted by the number of cached tables 160 that are distributed across the cached table storages 124. For example, the database manager 104 can be configured to adjust parameters of the cached table storage configuration information 114 to cause a more aggressive establishment of the cached tables 160 when available storage space is high across the cached table storages 124. Conversely, when available storage space is low across the cached table storages 124, the database manager 104 can adjust the parameters of the cached table storage configuration information 114 to implement a more selective approach with respect to establishing cached tables 160. In another example, the factors can include preemptively identifying—based on the structures/relationships of the entity table(s) 108, the property table(s) 110, and the value table(s) 112—fetch-based queries that likely will be issued by client devices 128, thereby eliminating the need for such queries to be manually input (e.g., by a database administrator) to trigger the creation of the cached tables 160. It is noted that the foregoing examples do not represent an exhaustive list of factors that are considered by the machine learning techniques implemented by the database manager 104. On the contrary, all aspects of the operation of the system 100 can be considered.

In any case, when the database manager 104 receives and processes database change queries 152 and database fetch queries 153—and deems that a follow-up action is necessary—the database manager 104 can transmit the appropriate information (e.g., the database delta information 154, the cached table storage configuration information 114, and so on) to the analyzer 120. In turn, and according to some embodiments, the analyzer 120 receives and processes the information received from the database manager 104. In particular, the analyzer 120 utilizes this information to identify when at least one cached table 160 needs to be established or updated (e.g., in accordance with a database change query 152 or a database fetch query 153). Next, the analyzer 120 can generate at least one update 158 that, when provided to and executed by the cached table storage 124, causes the aforementioned at least one cached table 160 to be established or placed into an "up-to-date" condition. In turn, the at least one cached table storage 124 can appropriately receive fetch queries 162 from the client devices 128 and issue fetch responses 164 to the client devices 128 through utilization of the at least one cached table 160.

Notably, the foregoing descriptions of the various computing devices included in the system 100 set forth scenarios in which different computing devices perform different functionalities in a largely isolated manner from one another. However, it is noted that the embodiments described herein can be implemented in virtually any distributed fashion, and that different ones of the computing devices in the system 100 can take on/shed different responsibilities without departing from the scope of this disclosure. For example, the central storage repository 102 can be configured to implement all or a portion of the responsibilities of the distributor 118, where the cached table storages 124 remain separate and distinct from the central storage repository 102. In another example, the central storage repository 102 can be configured to implement all or a portion of the responsibilities of both the distributor 118 and the cached table storages 124 (e.g., under an all-in-one approach). In yet another example, the client devices 128 can be configured to implement the responsibilities of the distributor 118/cached table storages 124 such that the client devices 128 can have direct access to up-to-date cached tables 160 (e.g., in an enterprise-style environment).

Accordingly, FIGS. 1A-1B provide overviews of different hardware/software architectures that can be implemented within different computing devices of the system 100 in order to carry out the various techniques described herein. A more detailed breakdown of the interactions of these computing devices will now be provided below in conjunction with FIGS. 2A-2E, 3A-3B, and 4A-4B.

Figure 2A:
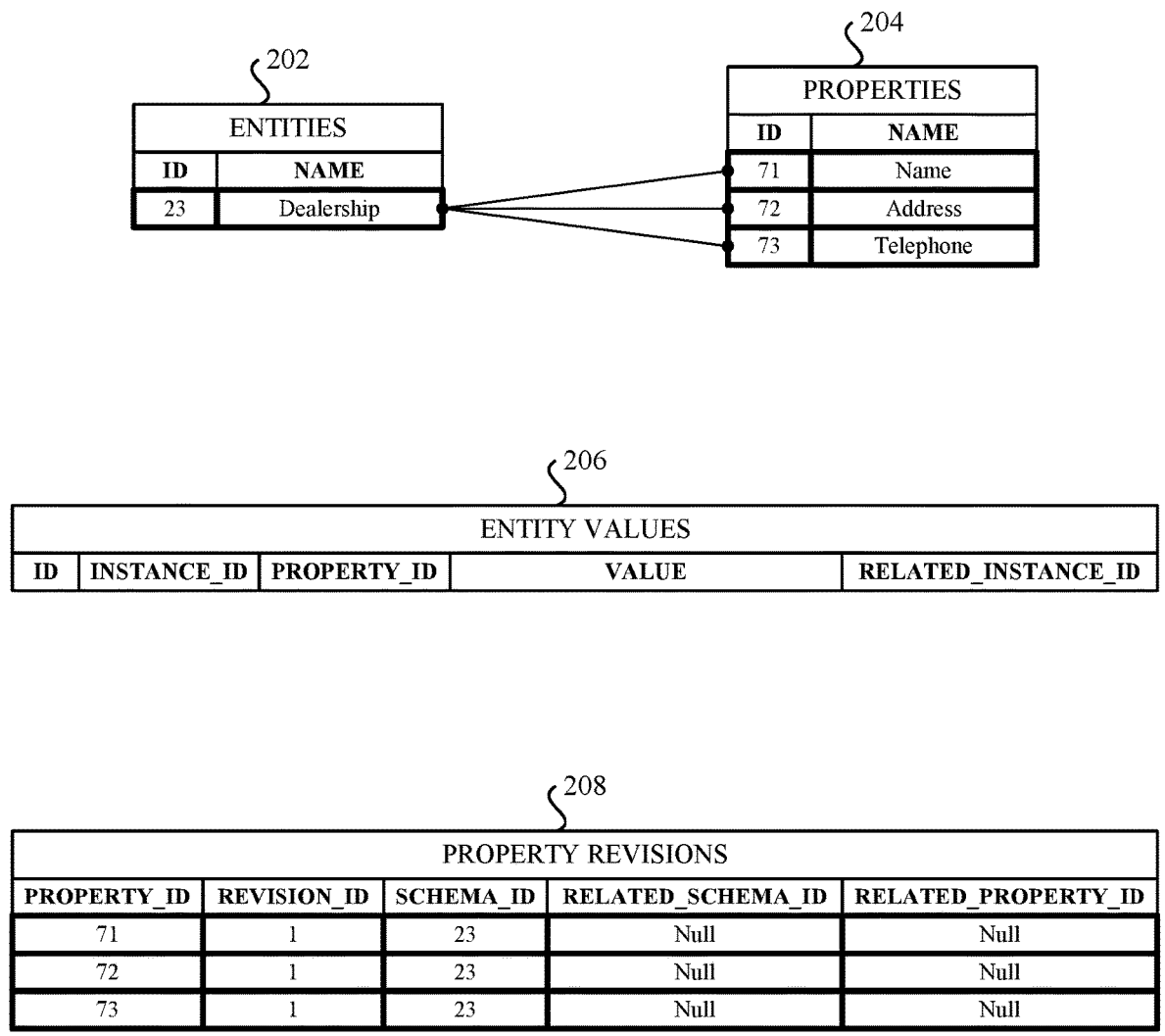

FIGS. 2A-2E illustrate conceptual diagrams of an example scenario in which the central storage repository 102—specifically, the database manager 104—is configured to identify conditions under which creations of/updates to cached tables 160 should be executed, according to some embodiments. As shown in the overview 210 illustrated in FIG. 2A, a first step can involve executing a request to add the entity "Dealership" to an entity table 108, which is illustrated in FIG. 2A as the entities table 202. Additionally, the first step can involve associating the properties "Name", "Address", and "Telephone" with the entity "Dealership". This can involve, for example, adding the aforementioned properties to a property table 110, which is illustrated in FIG. 2A as the properties table 204. Also, a value table 112 is included in FIG. 2A (illustrated as the values table 206), which is empty at the conclusion of the first step as actual values for the properties of the "Dealership" entity have not yet been established.

Notably, while the entity "Dealership" is described above as being associated with the "Name", "Address", and "Telephone" properties, it is noted that this association is not directly reflected by the entities table 202 and the properties table 204, as these tables do not include columns that effectively join (i.e., associate) the entries together. To cure this deficiency, the database manager 104 can be configured to implement "revisions" tables that (1) track the various transactions that are performed against the different tables described herein, and (2) associate the different entries with one another where appropriate. Moreover, the revisions tables can be managed in a manner that establishes a snapshot architecture under which different versions of the database can be regularly captured and restored at a fine level of granularity (e.g., per-transaction granularity).

For example, as shown in FIG. 2A, a property revisions table 208 can include a unique entry for each of the aforementioned "Name", "Address", and "Telephone" properties that are added to the properties table 204, where the "PROPERTY_ID" and "SCHEMA_ID" columns effectively associate these properties with the "Dealership" entity. Moreover, all of the entries are associated with the same "REVISION_ID" of "1" to reflect that the addition of these properties occurred via a single transaction. According to some embodiments, the REVISION_ID can be incremented each time the database manager 104 receives and performs a database update query (e.g., an insertion, a modification, a deletion, etc.). In this manner, the properties table 204 can be rolled back to a previous version by simply by deleting the appropriate entries in the property revisions table 208 (and corresponding entries in the properties table 204) in accordance with a desired restoration point. It is noted that the property revisions table 208 illustrated in FIG. 2A is exemplary and that additional revisions tables can be managed for the different tables included in the database 106, e.g., the entities table 202 and the values table 206. In this manner, separate channels of restoration points can be managed across the entity, attribute, and value tables included in the database 106, thereby providing a high level of flexibility for database administrators to manage their content. It is additionally noted that the revision tables are not required to implement the techniques described herein. On the contrary, the revisions tables can be implemented on an as-needed basis (e.g., based on a user preference). When revisions tables are not implemented, additional columns can be included in the various tables (in accordance with well-known techniques) to effectively associate the entries with one another.

Figure 2B:
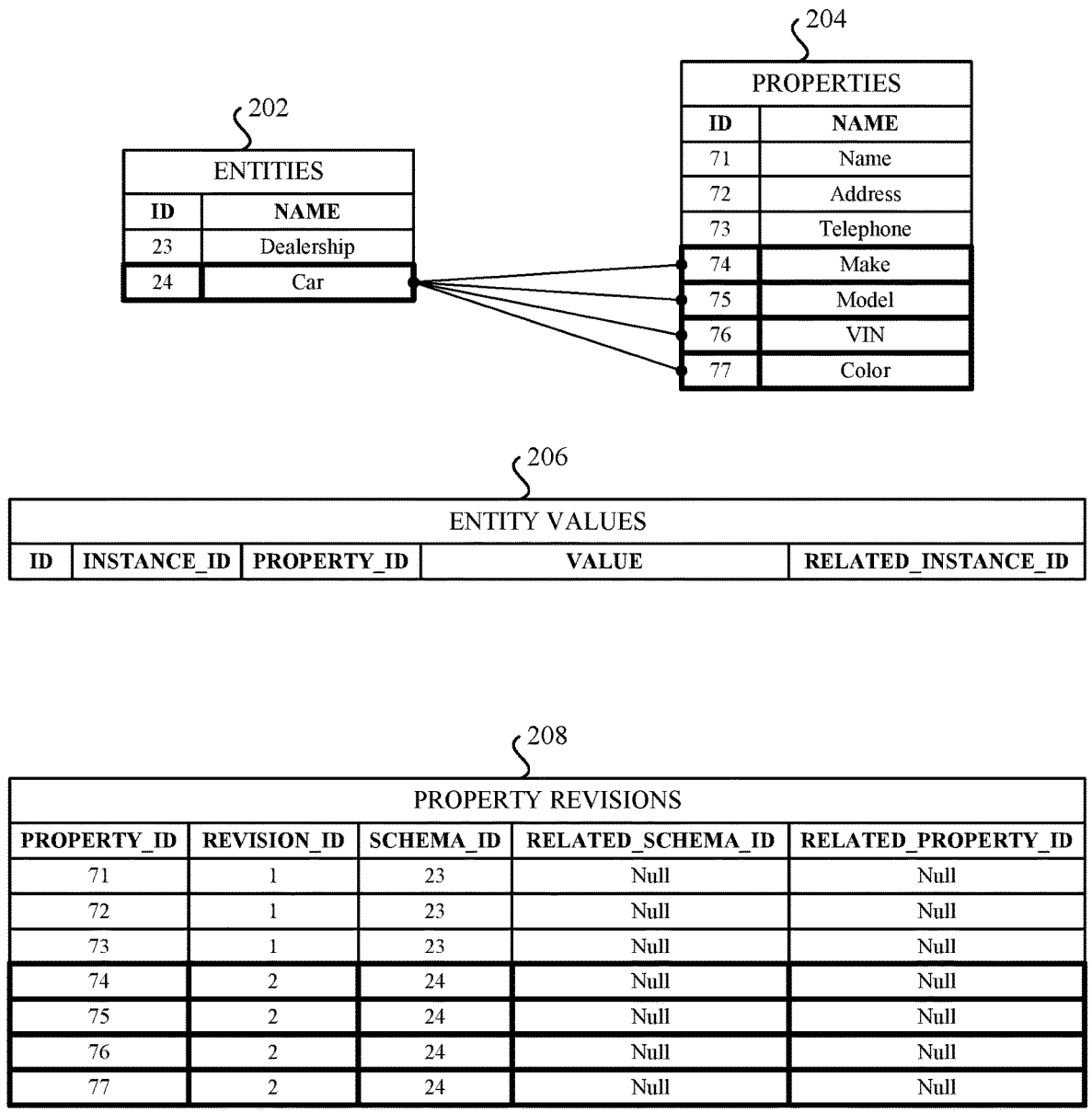

FIG. 2B illustrates an overview 220 of a second step that involves the database manager 104 executing a request to add the entity "Car" to the entities table 202. Additionally, the second step can involve associating the properties "Make", "Model", "Vehicle Identification Number (VIN)", and "Color" with the entity "Car". This can involve, for example, adding the aforementioned properties to the properties table 204. At the conclusion of the second step, the values table 206 remains empty as actual values for the properties of the "Dealership" and "Car" entities have not yet been established. Additionally, the property revisions table 208 can include a unique entry for each of the aforementioned "Make", "Model", "VIN", and "Color" properties that are added to the properties table 204, where the "PROPERTY_ID" and "SCHEMA_ID" columns effectively associate these properties with the "Car" entity. Moreover, all of the entries are associated with the same "REVISION_ID" of "2" to reflect that the addition of these properties occurred via a single transaction.

Figure 2C:
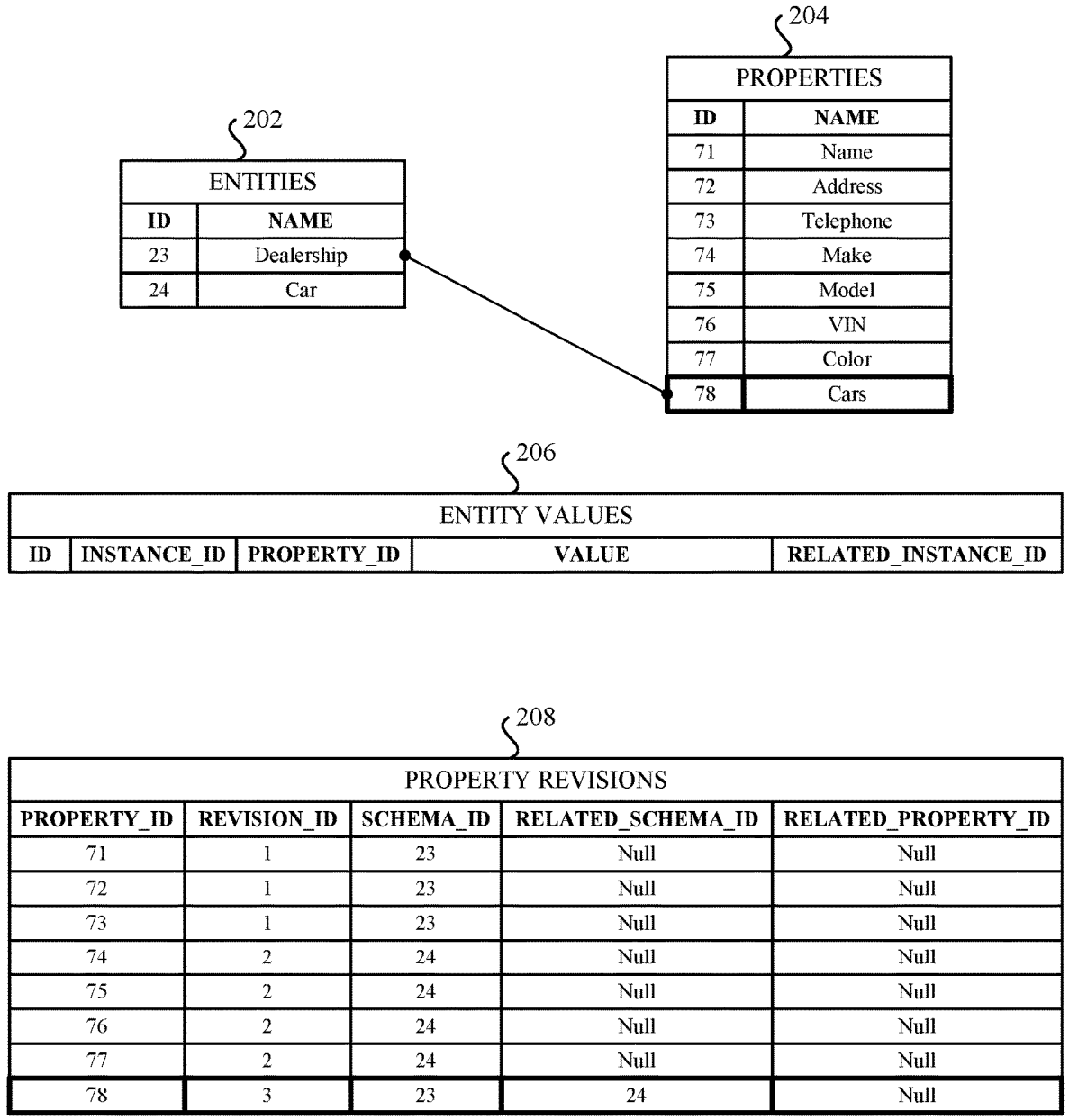

FIG. 2C illustrates an overview 230 of a third step that involves the database manager 104 executing a request to associate the property "Cars" with the entity "Dealership", where the "Cars" property takes the form of an array that stores "Car" entities (and their associated properties). This can involve, for example, adding the aforementioned property to the properties table 204. At the conclusion of the third step, the values table 206 continues to remain empty as actual values for the "Dealership" and "Car" entities have not yet been established. Additionally, the property revisions table 208 can include a unique entry the aforementioned "Cars" property added to the properties table 204, where the "PROPERTY_ID" and "SCHEMA_ID" columns effectively associate this property with the "Dealership" entity. Moreover, the entry is associated with the "REVISION_ID" of "3" to reflect that the addition of these properties occurred via a single transaction. Additionally, the entry can be assigned a value of "24" (i.e., the identifier for the "Car" entity) for the "RELATED_SCHEMA_ID" column, which effectively associates the "Dealership" entity with the "Car" entity stored in the entities table 202.

It is noted that at the conclusion of FIG. 2C, the database manager 104 has not yet identified a condition (e.g., based on the cached table storage configuration information 114) in which to cause cached tables 160 to be established within cached table storages 124, despite processing several database update requests (i.e., in accordance with the first, second, and third steps). Instead, the database manager 104 has refrained from introducing cached tables 160 because values for the various tables have not yet been established, and therefore there is not any data that is to be cached. This situation changes, however, as the additional steps described below in conjunction with FIGS. 2D-2E are executed, which involve introducing different values for the properties stored in the properties table 204. It is noted that the cached table storage configuration information 114 can be modified to change the aforementioned restrained behavior, such that the database manager 104 causes cached tables 160 even before data is populated into the database.

FIG. 2D illustrates an overview 240 of different steps that involve the database manager 104 executing a database change request—in particular, a database change request that provokes the database manager 104 to automatically cause the establishment of cached tables 160. It is noted that the revisions table 208 is omitted from FIGS. 2D-2E as additional revisions to the properties table 204 do not take place. As shown in FIG. 2D, a request involves inserting a car into the database 106 with the following property/value pairs: "Make:Toyota", "Model:Prius", "VIN:12345", and "Color:Blue". As shown in FIG. 2D, the fourth step can involve the database manager 104 adding the appropriate entries to the values table 206 (in accordance with aforementioned the property/value pairs). As noted above, at the conclusion of the fourth step, the database manager 104 determines (e.g., based on the cached table storage configuration information 114) that it is appropriate to cause the generation of different cached tables 160 in conjunction with adding the car into the database 106.

Accordingly, the fifth step illustrated in FIG. 2D captures this event, which involves the database manager 104 issuing, to at least one distributor 118, (1) database delta information 154—e.g., the car data introduced through the request, information about the tables in which the car data is stored, etc.—and (2) the cached table storage configuration information 114. It is noted that the cached table storage configuration information 114 can be utilized in different ways to enable the database manager 104 and the distributor 118 to effectively communicate with one another so the appropriate actions are taken. For example, the database manager 104 can utilize the cached table storage configuration information 114 to identify one or more appropriate distributors 118 to which the database delta information 154 should be provided. Moreover, the cached table storage configuration information 114, when provided to the distributor 118, can be used to communicate different aspects of the database delta information 154—e.g., the structures of the tables to which the database delta information 154 corresponds, rules for generating the cached tables 160, etc.—so that the distributor 118 can effectively cause the appropriate cached tables 160 to be created across one or more cached table storages 124. A more detailed breakdown of the different manners in which the cached table storage configuration information 114 can be utilized is provided below in conjunction with the sixth step illustrated in FIG. 2D.

At the sixth step of FIG. 2D, the at least one distributor 118 receives the aforementioned content from the database manager 104 and takes action based on one or more of the database delta information 154 and the cached table storage configuration information 114. For example, the cached table storage configuration information 114 can indicate that cached tables 160 should be generated (or updated after being been established) in accordance with new values that are added to the database 106. For example, in response to the insertion of the car data into the database 106, the at least one distributor 118 can respond by generating at least one cached table update 158 that is issued to at least one cached table storage 124. In turn, the at least one cached table update 158 causes the cached table storage 124 to establish, e.g., via database commands, (1) a cached car table 232, (2) a cached dealership table 234, and (3) a cached dealership/cars table 236, with values populated into the (1) cached car table 232 where appropriate. It is noted that the (2) cached dealership table 234 and the (3) cached dealership/cars table 236 both remain unpopulated with entries as values have not been inserted into the database 106 that would otherwise apply to these cached tables.

Accordingly, at the conclusion of the sixth step, at least three cached tables are established in at least one cached table storage 124 (by way of the at least one distributor 118). In this manner, the at least one cached table storage 124 is capable of servicing fetch requests that likely will be issued by client devices 128—e.g., requests to view all of the cars in the database 106 in isolation from their dealerships (via the cached car table 232), requests to view all of the dealerships in the database 106 in isolation from their cars (via the cached dealership table 234), and requests to view all of the cars in the database 106 that are available at a specific dealership (via the cached dealerships/cars table 236).

It is noted that the cached table updates 158 issued by the distributor 118 can take many different forms with respect to the manner in which the database delta information 154/cached table storage configuration information 114 is packaged and delivered to the distributor 118. For example, in some embodiments, the database manager 104 can be configured to fully establish and provide the cached tables 160 to the distributor 118, thereby obviating the need for the distributor 118 to generate the cached table updates 158 for delivery to the cached table storages 124 (as the cached tables 160 received from the database manager 104 can be delivered directly instead). However, this approach will decrease in efficiency as the size of the database 106 grows over time (and would involve redundant copies of data being transmitted between the database managers 104, the distributors 118, and the cached table storages 124). Accordingly, the cached table updates 158/cached table storage configuration information 114 provide a meaningful way to efficiently propagate the modifications that originate at the central storage repository 102 and trickle down to the cached table storages 124.

FIG. 2E illustrates an overview 250 of additional steps that involve the database manager 104 executing a database change request that provokes the database manager 104 to automatically cause an update to occur against the cached tables 160 established in conjunction with the fifth and sixth steps of FIG. 2D. As shown in FIG. 2E, a seventh step involves the database manager 104 receiving a request to insert a dealership into the database 106 with the following property/value pairs: "Name:Autonation", "Address:Sunnyvale", "Telephone:0001112222", and "Cars:{1994}". As shown in FIG. 2E, the seventh step can involve the database manager 104 adding the appropriate entries to the values table 206 (in accordance with aforementioned the property/value pairs). It is noted that the identifier "1994" corresponds to the identifier established for the car that was inserted into the database 106 at the fourth step illustrated in FIG. 2D. As noted above, at the conclusion of the seventh step, the database manager 104 determines (e.g., based on the cached table storage configuration information 114) that it is appropriate to update the cached tables 160 in conjunction with adding the dealership into the database 106.

Accordingly, an eighth step illustrated in FIG. 2E captures this event, which involves the database manager 104 issuing, to the at least one distributor 118, (1) database delta information 154—e.g., the dealership data introduced through the request, information about the tables in which the dealership data is stored, etc.—and (2) the cached table storage configuration information 114. At a ninth step of FIG. 2E, the at least one distributor 118 receives the aforementioned content from the database manager 104 and takes action based on one or more of the database delta information 154 and the cached table storage configuration information 114. For example, the cached table storage configuration information 114 can indicate that the cached dealership table 234 and the cached dealership/cars table 236 should be updated in accordance with the database delta information 154, which involves adding the appropriate entries to these tables (as illustrated in FIG. 2E).

Accordingly, at the conclusion of the ninth step, the at least one cached table storage 124 is capable of servicing the aforementioned fetch requests that likely will be issued by client devices 128—e.g., requests to view all of the cars in the database 106 in isolation from their dealerships (via the cached car table 232), requests to view all of the dealerships in the database 106 in isolation from their cars (via the cached dealership table 234), and requests to view all of the cars in the database 106 that are available at a specific dealership (via the cached dealerships/cars table 236). As additionally content is added to the database 106—e.g., additional entities, additional properties, additional dealership/car data, etc.—the database manager 104 can interface with the at least one distributor 118 and provide the information that enables the at least one distributor 118 to properly manage the cached tables 160 across the cached table storages 124.

It is noted that FIGS. 2D-2E involve generating cached tables 160 as database manager 104 receives and processes database change queries (e.g., insertions, updates, deletions, etc.). A more detailed breakdown of the manner in which such changed-based queries are managed is provided below in conjunction with FIGS. 3A and 4A. However, as previously described herein, the database manager 104 can also be configured to cause the generation of cached tables 160 in response to other types of events, including receiving and processing database fetch queries (e.g., selections). For example, the database manager 104 can be configured to identify fetch queries that are frequently issued by client devices 128, fetch queries that are computationally-intensive (e.g., complex conditions associated with a "WHERE" clause, costly "JOIN" operations, etc.), and so on. In response to identifying these fetch queries, the database manager 104 can cause the creation of cached tables 160 that will help increase the overall efficiency by which fetch-based requests (issued by client devices 128) can be responded to by the cached table storages 124. A more detailed breakdown of the manner in which such fetch-based queries are managed is provided below in conjunction with FIGS. 3B and 4B.

Figure 3A:
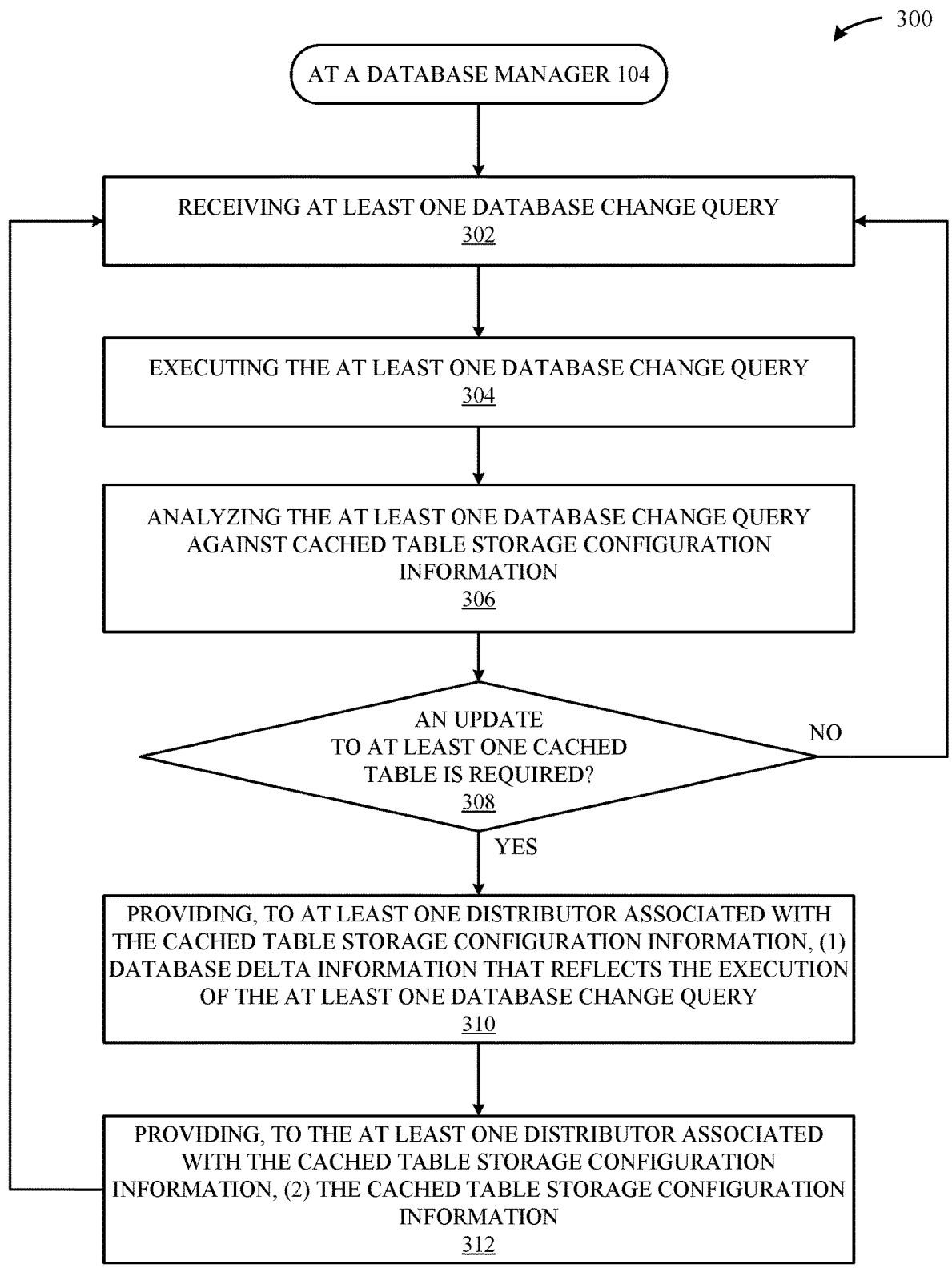
FIG. 3A illustrates a first method for updating distributed cached tables associated with a database in response to receiving database change queries, according to some embodiments.

FIG. 3A illustrates a first method 300 for updating distributed cached tables associated with a database in response to receiving database change queries, according to some embodiments. According to some embodiments, the method 300 can be implemented by the database manager 104, and begins at step 302, where the database manager 104 receives at least one database change query. At step 304, the database manager 104 executes the at least one database change query. At step 306, the database manager 104 analyzes the at least one database change query against cached table storage configuration information. At step 308, the database manager 104 determines (in accordance with the analysis) whether an update to at least one cached table is required (e.g., as described above in conjunction with FIG. 2D). It is noted that the term "update" within the context of FIG. 3A can represent the creation of, update to, or deletion of a cached table 160. If, at step 308, the database manager 104 determines that an update to at least one cached table is required, then the method 300 proceeds to step 310. Otherwise, the method 300 proceeds back to step 302, where the database manager 104 can receive, process, and respond (when necessary) to additional database change queries. At step 310, the database manager 104 provides, to at least one distributor associated with the cached table storage configuration information, (1) database delta information that reflects the execution of the at least one database change query (e.g., as also described above in conjunction with FIG. 2D). Finally, at step 312, the database manager 104 provides, to the at least one distributor associated with the cached table storage configuration information, (2) the cached table storage configuration information (e.g., as further described above in conjunction with FIG. 2D).

Figure 3B:
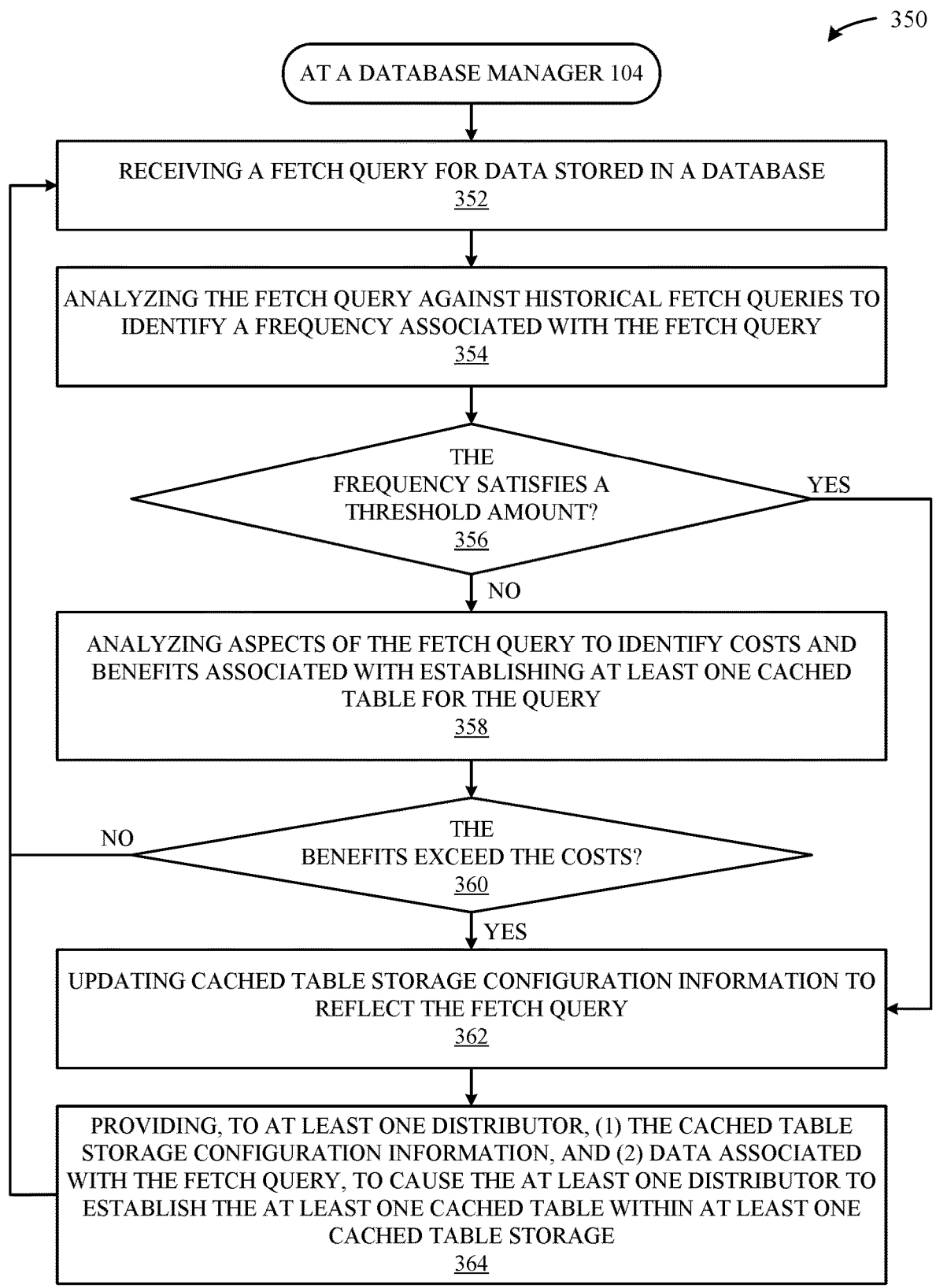
FIG. 3B illustrates a second method for updating distributed cached tables associated with a database in response to receiving database fetch queries, according to some embodiments.

FIG. 3B illustrates a second method 350 for updating distributed cached tables associated with a database in response to receiving database fetch queries, according to some embodiments. According to some embodiments, the method 350 can be implemented by the database manager 104, and begins at step 352, where the database manager 104 receives a fetch query for data stored in a database. At step 354, the database manager 104 analyzes the fetch query against historical fetch queries to identify a frequency associated with the fetch query. At step 356, the database manager 104 determines whether the frequency satisfies a threshold amount. If, at step 356, the database manager 104 determines that the frequency satisfies a threshold amount, then the method 350 proceeds to step 362, which is described below in greater detail. Otherwise, the method 350 proceeds to step 358. At step 358, the database manager 104 analyzes aspects of the fetch query to identify costs and benefits associated with establishing at least one cached table for the query (e.g., using the techniques described herein). At step 360, the database manager 104 determines whether the benefits exceed the costs. If, at step 360, the database manager 104 determines that the benefits exceed the costs, then the method 350 proceeds to step 362. Otherwise, the method 350 proceeds to back to step 352, where the database manager 104 can respond to additional database fetch queries. At step 362, the database manager 104 updates cached table storage configuration information to reflect the fetch query. Finally, at step 364, the database manager 104 provides, to at least one distributor, (1) the cached table storage configuration information, and (2) data associated with the fetch query, to cause the at least one distributor to establish the at least one cached table within at least one cached table storage.

Figure 4A:
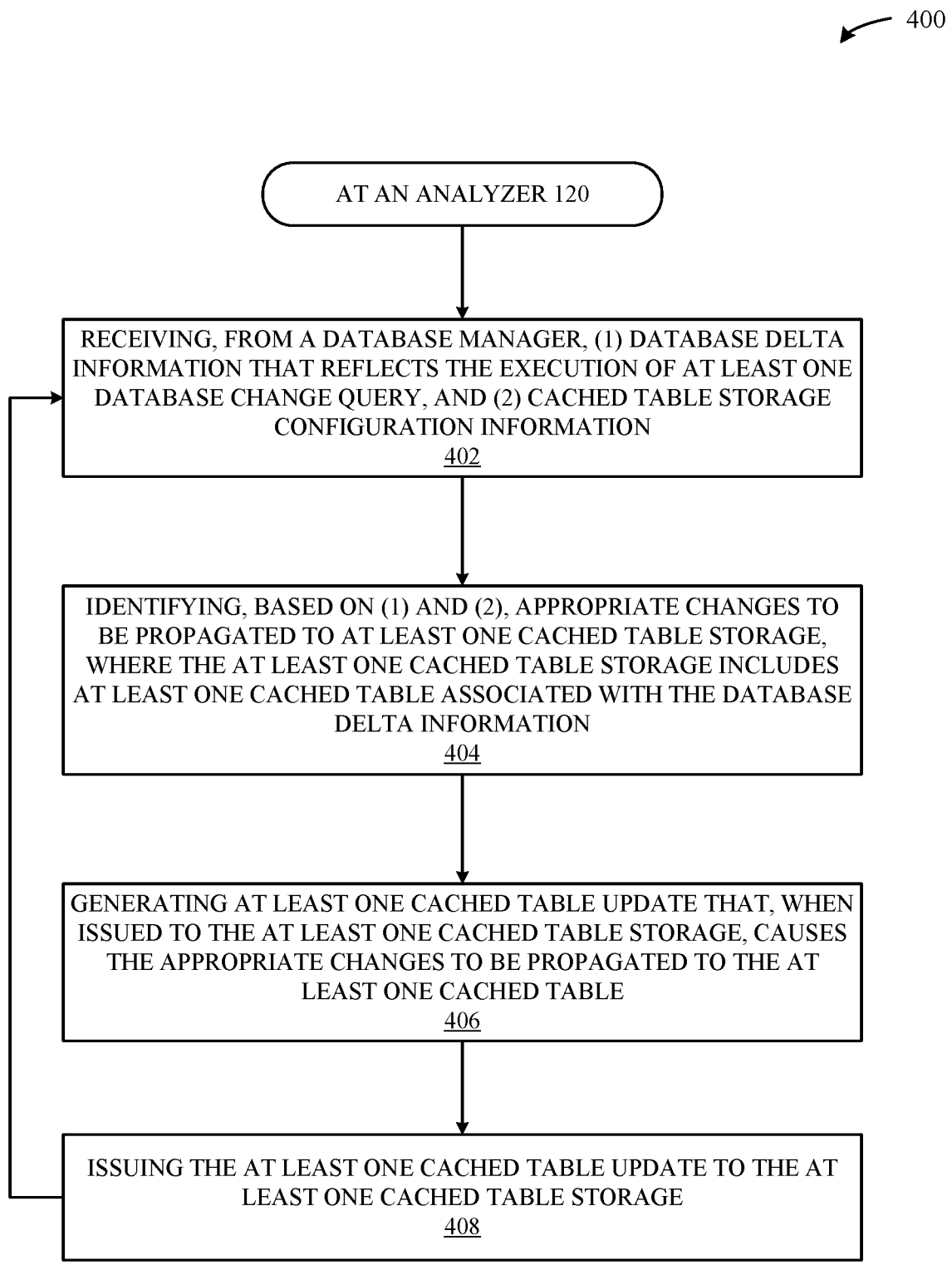
FIG. 4A illustrates a first method for updating distributed cached tables associated with a database in response to receiving database change queries, according to some embodiments.

FIG. 4A illustrates a first method 400 for updating distributed cached tables associated with a database in response to receiving database change queries, according to some embodiments. It is noted that the method 400 can represent a counterpart to the method 300 described above in conjunction with FIG. 3A. According to some embodiments, the method 400 can be implemented by an analyzer 120 (of a distributor 118), and begins at step 402, where the analyzer 120 receives, from a database manager, (1) database delta information that reflects the execution of at least one database change query, and (2) cached table storage configuration information. At step 404, the analyzer 120 identifies, based on (1) and (2), appropriate changes to be propagated to at least one cached table storage, where the at least one cached table storage includes at least one cached table associated with the database delta information. At step 406, the analyzer 120 generates at least one cached table update that, when issued to the at least one cached table storage, causes the appropriate changes to be propagated to the at least one cached table. Finally, at step 408, the analyzer 120 issues the at least one cached table update to the at least one cached table storage.

Figure 4B:
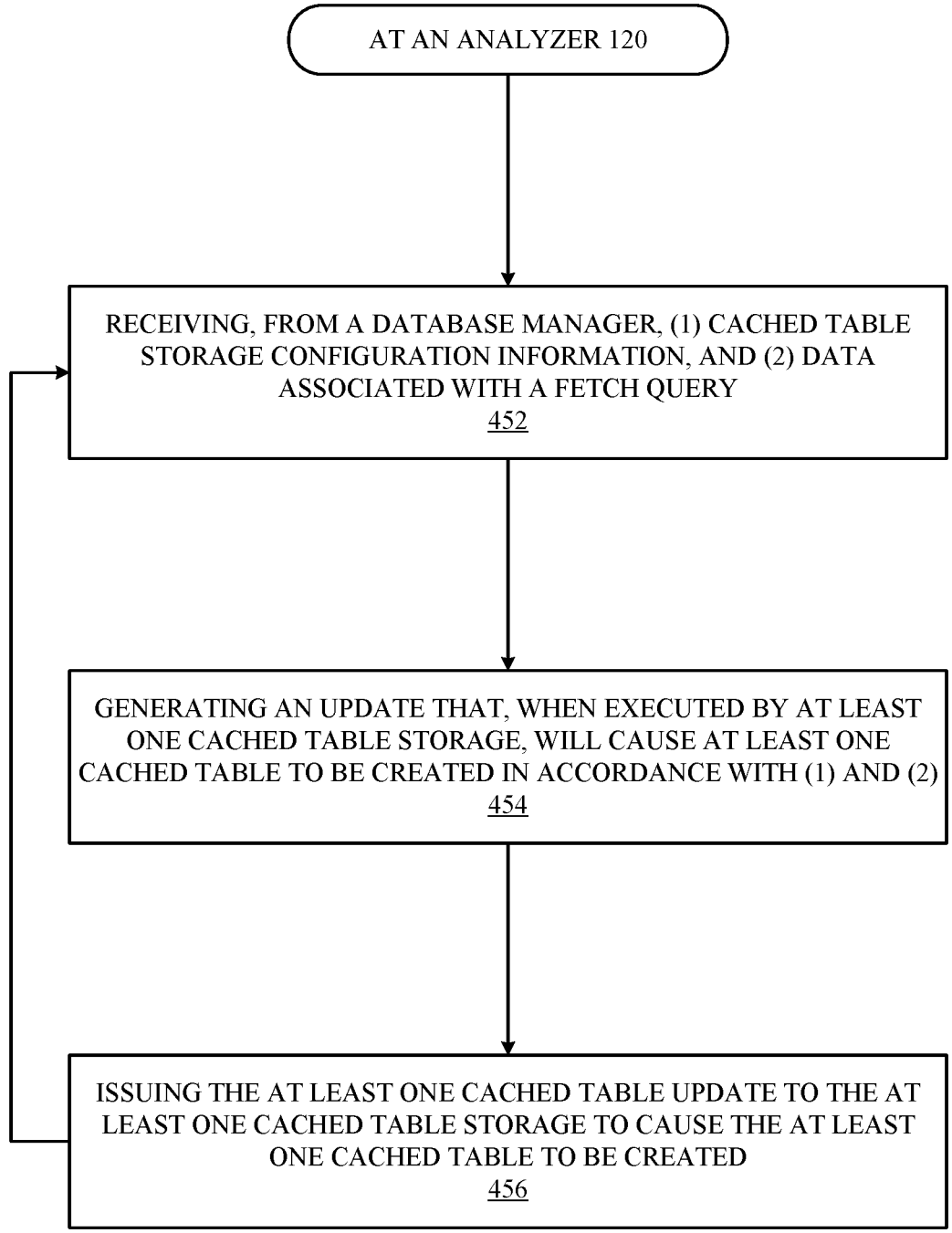
FIG. 4B illustrates a second method for updating distributed cached tables associated with a database in response to receiving database fetch queries, according to some embodiments.

FIG. 4B illustrates a second method 450 for updating distributed cached tables associated with a database in response to receiving database fetch queries, according to some embodiments. It is noted that the method 450 can represent a counterpart to the method 350 described above in conjunction with FIG. 3B. According to some embodiments, the method 450 can be implemented by an analyzer 120 (of a distributor 118), and begins at step 452, where the analyzer 120 receives, from a database manager, (1) cached table storage configuration information, and (2) data associated with a fetch query. At step 454, the analyzer 120 generates an update that, when executed by at least one cached table storage, will cause at least one cached table to be created in accordance with (1) and (2). At step 456, the analyzer 120 issues the at least one cached table update to the at least one cached table storage to cause the at least one cached table to be created.

Figure 5:
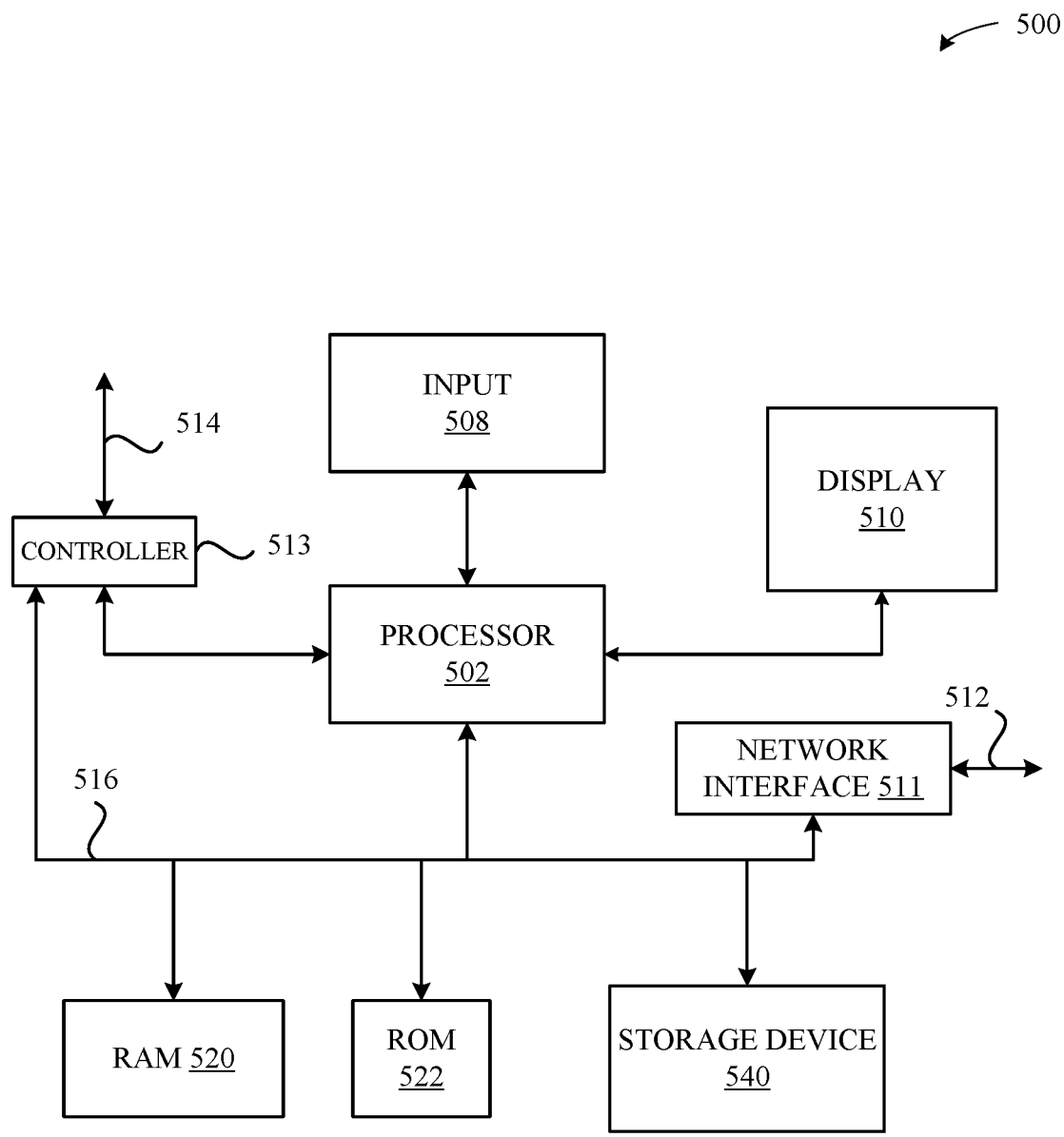
FIG. 5 illustrates a detailed view of a computing device that can be used to implement the various techniques described herein, according to some embodiments.

FIG. 5 illustrates a detailed view of a computing device 500 that can be used to implement the various components described herein, according to some embodiments. In particular, the detailed view illustrates various components that can be included in the computing devices of the system 100 described in conjunction with FIGS. 1A-1B. As shown in FIG. 5, the computing device 500 can include a processor 502 that represents a microprocessor or controller for controlling the overall operation of the computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, and so on. Still further, the computing device 500 can include a display 510 that can be controlled by the processor 502 to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include a wireless transceiver.

As noted above, the computing device 500 also include the storage device 540, which can comprise a single disk or a collection of disks (e.g., hard drives), and includes a storage management module that manages one or more partitions within the storage device 540. In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of applications executing on the various computing devices of the system 100, e.g., the database 106, the analyzer 120, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for updating distributed cached tables associated with a database, the method comprising, at a computing device:
   receiving and executing at least one database change query;
   analyzing the at least one database change query against cached table storage configuration information to determine whether an update to at least one cached table is required; and
   in response to determining that the update to the at least one cached table is required:
      providing, to at least one distributor associated with the cached table storage configuration information, database delta information that reflects the execution of the at least one database change query, and
      updating at least one revisions table in accordance with the update, wherein the at least one revisions table:
         establishes snapshots that correspond to updates that are made to the database by recording different database change queries received at the computing device, and
         enables any snapshot of the database to be restored via a single database change query that causes all entries within the at least one revisions table that were written subsequent to the particular snapshot to be deleted.

2. The method of claim 1, wherein the at least one database change query comprises a database update query, a database insertion query, or a database deletion query.

3. The method of claim 1, wherein the cached table storage configuration information identifies at least one cached table storage that stores the at least one cached table.

4. The method of claim 3, wherein the at least one cached table storage services fetch queries issued by client methods.

5. The method of claim 1, wherein the update to the at least one cached table is required if the at least one database change query modifies data that corresponds to the at least one cached table.

6. The method of claim 1, wherein, in response to receiving the database delta information, the at least one distributor causes the at least one cached table to be updated to reflect the database delta information.

7. The method of claim 1, wherein the update to the at least one cache table involves creating, updating, or deleting the at least one cache table.

8. The method of claim 7, wherein updating the at least one cache table comprises adding or deleting at least one property associated with the at least one cache table.

9. At least one non-transitory computer readable storage medium configured to store instructions that, when executed by at least one processor included in a computing device, cause the computing device to update distributed cached tables associated with a database, by carrying out steps that include:
   receiving and executing at least one database change query;
   analyzing the at least one database change query against cached table storage configuration information to determine whether an update to at least one cached table is required; and
   in response to determining that the update to the at least one cached table is required:
      providing, to at least one distributor associated with the cached table storage configuration information, database delta information that reflects the execution of the at least one database change query, and
      updating at least one revisions table in accordance with the update, wherein the at least one revisions table:
         establishes snapshots that correspond to updates that are made to the database by recording different database change queries received at the computing device, and
         enables any snapshot of the database to be restored via a single database change query that causes all entries within the at least one revisions table that were written subsequent to the particular snapshot to be deleted.

10. The at least one non-transitory computer readable storage medium of claim 9, wherein the at least one database change query comprises a database update query, a database insertion query, or a database deletion query.

11. The at least one non-transitory computer readable storage medium of claim 9, wherein the cached table storage configuration information identifies at least one cached table storage that stores the at least one cached table.

12. The at least one non-transitory computer readable storage medium of claim 11, wherein the at least one cached table storage services fetch queries issued by client methods.

13. The at least one non-transitory computer readable storage medium of claim 9, wherein the update to the at least one cached table is required if the at least one database change query modifies data that corresponds to the at least one cached table.

14. The at least one non-transitory computer readable storage medium of claim 9, wherein, in response to receiving the database delta information, the at least one distributor causes the at least one cached table to be updated to reflect the database delta information.

15. A computing device configured to update distributed cached tables associated with a database, the computing device comprising:
   at least one processor; and
   at least one memory storing instructions that, when executed by the at least one processor, cause the computing device to perform steps that include:
      receiving and executing at least one database change query;
      analyzing the at least one database change query against cached table storage configuration information to determine whether an update to at least one cached table is required; and
      in response to determining that the update to the at least one cached table is required:
         providing, to at least one distributor associated with the cached table storage configuration information, database delta information that reflects the execution of the at least one database change query, and updating at least one revisions table in accordance with the update, wherein the at least one revisions table:
- establishes snapshots that correspond to updates that are made to the database by recording different database change queries received at the computing device, and
- enables any snapshot of the database to be restored via a single database change query that causes all entries within the at least one revisions table that were written subsequent to the particular snapshot to be deleted.

16. The computing device of claim 15, wherein the at least one database change query comprises a database update query, a database insertion query, or a database deletion query.

17. The computing device of claim 15, wherein the cached table storage configuration information identifies at least one cached table storage that stores the at least one cached table.

18. The computing device of claim 17, wherein the at least one cached table storage services fetch queries issued by client methods.

19. The computing device of claim 15, wherein the update to the at least one cached table is required if the at least one database change query modifies data that corresponds to the at least one cached table.

20. The computing device of claim 15, wherein, in response to receiving the database delta information, the at least one distributor causes the at least one cached table to be updated to reflect the database delta information.

* * * * *